US009686526B2

(12) United States Patent
Pettersson et al.

(10) Patent No.: US 9,686,526 B2
(45) Date of Patent: Jun. 20, 2017

(54) OBJECTIVE 3D VIDEO QUALITY ASSESSMENT MODEL

(75) Inventors: Martin Pettersson, Vallentuna (SE); Usman Hakeem, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 384 days.

(21) Appl. No.: 14/349,054

(22) PCT Filed: Mar. 29, 2012

(86) PCT No.: PCT/EP2012/055707
§ 371 (c)(1),
(2), (4) Date: Aug. 25, 2014

(87) PCT Pub. No.: WO2013/050184
PCT Pub. Date: Apr. 11, 2013

(65) Prior Publication Data
US 2015/0042752 A1    Feb. 12, 2015

Related U.S. Application Data

(60) Provisional application No. 61/542,954, filed on Oct. 4, 2011.

(51) Int. Cl.
*H04N 13/00* (2006.01)
(52) U.S. Cl.
CPC ..... *H04N 13/0007* (2013.01); *H04N 13/0037* (2013.01); *H04N 13/0059* (2013.01); *H04N 13/0033* (2013.01); *H04N 2213/002* (2013.01)
(58) Field of Classification Search
None
See application file for complete search history.

(56) References Cited

U.S. PATENT DOCUMENTS

| 8,817,071 B2 * | 8/2014 | Wang ............... G06T 7/0022 348/43 |
| 2007/0139612 A1 * | 6/2007 | Butler-Smith ..... H04N 13/0003 351/201 |
| 2010/0091097 A1 * | 4/2010 | Pockett .............. H04N 13/0018 348/54 |

(Continued)

FOREIGN PATENT DOCUMENTS

| EP | 0 963 122 A2 | 12/1999 | |
| EP | 1 791 371 A2 | 5/2007 | |
| JP | EP 0963122 A2 * | 12/1999 | ......... H04N 13/0011 |

OTHER PUBLICATIONS

Kim et al. "Depth Adjustment for Stereoscopic Image Using Visual Fatigue Prediction and Depth-Based View Synthesis", Jul. 23, 2010, IEEE International Conference on Multimedia and Expo (ICME), pp. 956-961.*

(Continued)

*Primary Examiner* — James M Anderson, II
(74) *Attorney, Agent, or Firm* — Sage Patent Group

(57) ABSTRACT

There is provided a method of determining the quality of a three dimensional (3D) video stream, wherein the 3D video comprises at least one 3D view composition, each 3D view composition defining a plurality of two dimensional (2D) views. The method comprises determining a characteristic of each of a plurality of 2D views. The method further comprises calculating a variation in the characteristic, the variation calculated between the 2D views corresponding to the same 3D view composition. The method further still comprises calculating a quality score for the 3D video sequence, the quality score based upon the calculated variation.

13 Claims, 6 Drawing Sheets

(56) References Cited

U.S. PATENT DOCUMENTS

2011/0305383 A1* 12/2011 Lee .................. H04N 19/124
  382/154
2011/0316985 A1* 12/2011 Ishikawa ............ G02B 27/2214
  348/51

OTHER PUBLICATIONS

International Search Report, Application No. PCT/EP2012/055707, Sep. 24, 2012.
Written Opinion of the International Searching Authority, Application No. PCT/EP2012/055707, Sep. 24, 2012.
Benoit et al., "Quality Assessment of Stereoscopic Images", *EURASIP Journal on Image and Video Processing*, vol. 2008, Article ID 659024, Jan. 26, 2009, 13 pp.
Boev et al., "Towards compound stereo-video quality metric; a specific encoder-based framework", *2006 IEEE Southwest Symposium on Image Analysis and Interpretation*, Mar. 26-28, 2006, pp. 218-222.
Gorley et al., "Stereoscopic Image Quality Metrics and Compression", *Proceedings of SPIE-IS&T Electronic Imaging*, SPIE vol. 6803, Feb. 29, 2008, 12 pp.
ISO/IEC Video and Requirements Group, "Vision on 3D Video", ISO/IEC JTC1/SC29/VVG11, MPEG 2009/N10357, Feb. 2009, 2 pp.
Mittal et al., "Algorithmic Assessment of 3D Quality of Experience for Images and Videos", *2011 IEEE Digital Signal Processing Workshop and IEEE Signal Processing Eduction Workshop (DSP/SPE)*, Jan. 4-7, 2011, pp. 338-343.
Shao et al., "Objective Quality Assessment of Depth Image Based Rendering in 3DTV System", *IEEE 3DTV Conference: The True Vision—Capture, Transmission and Display of 3D Video*, May 4-6, 2009, 4 pp.
Smolic et al., "An Overview of Available and Emerging 3D Video Formats and Depth Enhanced Stereo As Efficient Generic Solution", *IEEE 2009 Picture Coding Symposium*, May 6-8, 2009, 4 pp.

* cited by examiner

Left Camera (340)

Right Camera (345)

Fig. 5a
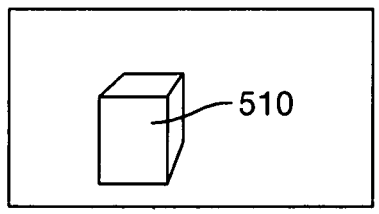
Fig. 5b
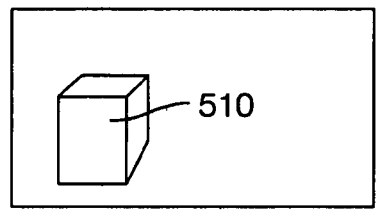
Fig. 6a
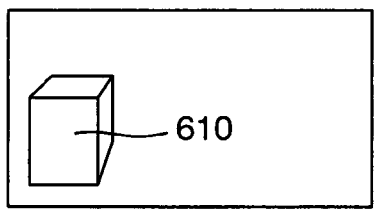
Fig. 6b
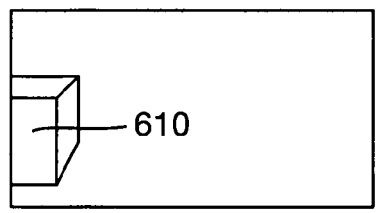
Fig. 7
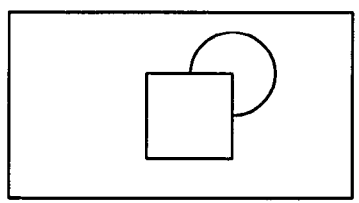
a
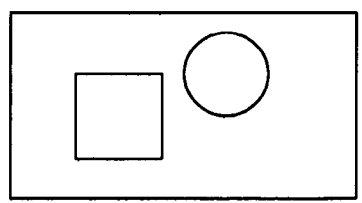
b
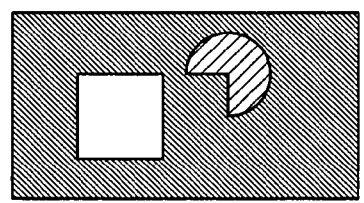
c
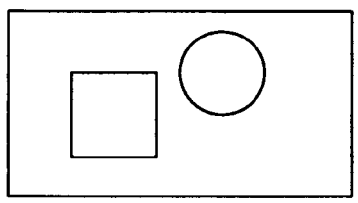
d
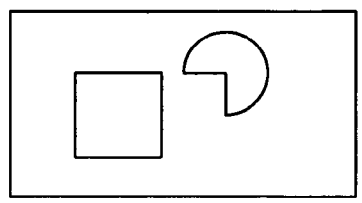
e
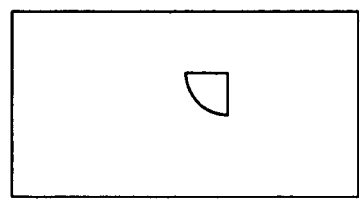
f

OBJECTIVE 3D VIDEO QUALITY ASSESSMENT MODEL

CROSS REFERENCE TO RELATED APPLICATIONS

This application is a 35 U.S.C. §371 national stage application of PCT International Application No. PCT/EP2012/055707, filed on 29 Mar. 2012, which itself claims priority to U.S. Provisional Patent Application No. 61/542,954, filed 4 Oct. 2011, the disclosure and content of both of which are incorporated by reference herein in their entirety. The above-referenced PCT International Application was published in the English language as International Publication No. WO 2013/050184 A1 on 11 Apr. 2013.

TECHNICAL FIELD

The present application relates to a method of determining the quality of a three dimensional (3D) video stream; a computer-readable medium; and an apparatus for determining the quality of a three dimensional (3D) video stream.

BACKGROUND

Three Dimensional (3D) video is one of the lesser understood forms of video making in present times. The first work on 3D stereoscopy dates back to 1838 when Charles Wheatstone showed that the difference in the left and right images, as viewed by each eye of a viewer is interpreted by brain as a three dimensional image. When we see the world around us with our two eyes, we experience binocular stereopsis. It is the ability of our brain to combine two images of slightly different perspective that enables us to perceive depth. Depending on the differences in apparent position of objects within the two images, some of the objects appear closer than others.

The conventional form of stereoscopy is to use two 2D (two dimensional) images with each providing a different perspective to the brain. A slight change in perspective in horizontal direction allows the brain of a viewer to perceive depth. The horizontal difference between the two 2D images i.e. the left and right views is called disparity. Disparity is a very important cue in the perceived spatial depth of the object in stereoscopic vision.

To view the stereoscopic 3D video the viewer usually has to wear 3D glasses to filter a different image to each eye. Autostereoscopic displays use the angular separation of the viewers eyes to project a different image to each eye of a viewer and hence these do not require glasses for the 3D effect. In autostereoscopic displays for multiple viewers, several views are used to generate the 3D video allowing more flexibility in viewing angle thus enabling multiple viewers to watch the 3D video.

Apart from the advances in display technologies in 3D video, work is also carried out to standardize coding schemes for multiview 3D. Multiview Video Coding (MVC) enables efficient encoding of sequences captured from multiple cameras and on the receiver end additional intermediate views can be synthesized for free viewpoint TV. In all, a lot of work is being put in 3D video, so that viewers can use 3D video in different applications. On the other hand there has not been much work done to evaluate the quality of 3D video being produced from different displays.

Evaluation of 2D video data can be done based on subjective or objective tests. In subjective test several viewers are shown the test video and are asked to rate it on a scale. The process of subjectively evaluating the quality of a video is expensive and time consuming. In contrast objective tests can be performed by a computer and hence are easier and less costly. Still, accurate subjective tests are used as a benchmark for the evaluation of objective tests. There are many objective methods available which can be used to evaluate the quality of 2D video with high accuracy. In case of 3D video there is lack of research both in terms of subjective tests and on objective methods.

SUMMARY

An objective assessment of video quality is provided by extracting a number of parameters from two input views, each input view giving a different perspective of a 3D scene allowing a viewer's brain to perceive the 3D scene. These parameters are then compared to assess the quality of the 3D video. The parameters extracted from the 2D views may include the impact of vertical shift between the two views, asymmetric coding between two views, differences in luminance and chrominance between two views, impact of negative parallax, image border 3D artifacts and view synthesis artifacts. Further, by utilizing the disparity map along with other parameters produced from the left and right views, an estimate of vertical and horizontal shifts, negative parallaxes, occlusions and image border artifacts can be made. By including one or more of these parameters in a 3D video quality assessment model the estimation of the 3D video quality can be improved compared to state-of-the-art models. Specifically, it will be possible to detect whether the perception of the 3D video is outside the boundaries of what is acceptable for a human viewer.

Accordingly, there is provided a method of determining the quality of a three dimensional (3D) video stream. The 3D video comprises at least one 3D view composition, each 3D view composition defining a plurality of two dimensional (2D) views. The method comprises determining a characteristic of each of a plurality of 2D views. The method further comprises calculating a variation in the characteristic, the variation calculated between the 2D views corresponding to the same 3D view composition. The method further comprises calculating a quality score for the 3D video sequence, the quality score based upon the calculated variation.

By calculating a variation in a characteristic of at least two 2D views of a 3D composition, a quantitative determination can be made of the quality of a 3D effect created by the 3D composition. Such variation between 2D views is common in 3D video streams due to the capturing, encoding and decoding processes, and so the above method provides a useful determination of quality of a 3D video stream.

The characteristic of a 2D view may comprise any of: horizontal shift; vertical shift; 2D quality score; luminance; chrominance; and quantization parameter.

A horizontal shift and/or a vertical shift can be calculated between two views of the same 3D view composition by identifying like features in each view and calculating the difference in their position. Like features may be identified using a matching algorithm such as the SIFT algorithm. The quantization parameter may be obtained from an encoded video bistream. The quantization parameter may be obtained prior to decoding the encoded video bitstream.

Where the characteristic of a 2D view that is determined is horizontal shift, the method may further comprise generating a disparity map from the horizontal shift between at least two 2D views corresponding to the same 3D view composition.

The quality score may be based upon the detection of at least one item present in a 2D view but missing from another; whereby an item is detected as missing if the horizontal shift measured in the vicinity of the item exceeds the distance of the item from a view boundary. The item may be an object or a portion of an object such as an edge. For example, the item may be an edge of a box, or a portion of the outline of a ball.

The quality score may be based upon the detection of inverted parallax; whereby inverted parallax is detected if a majority of the calculated points of the disparity map are negative. Inverted parallax occurs when at least two 2D views of a 3D view composition are interchanged. A negative point on the disparity map indicates an object's depth position as in front of the screen. In 3D video, the majority of objects have a depth position into the screen, with an occasional object displayed out of the screen, such as a ball moving out of the screen towards the viewer. Such an arrangement presents the most comfortable viewing experience for the viewer. Therefore, if a majority of calculated points in the disparity map have a negative depth (indicating they are viewed as in front of the screen), then the views that the disparity map corresponds to are in the wrong viewing position and inverted parallax is identified.

The quality score may be based upon an estimation of view synthesis artifacts. A view synthesis artifact is detected by: performing edge detection on at least one view to create a first edge map; performing edge detection on a disparity map corresponding to the at least one view to create a second edge map; and calculating the symmetric difference between the first and the second edge maps.

An estimation of view synthesis artifacts may be calculated from the disoccluded area of a synthesized view. The area defined by the symmetric difference between the first and the second edge maps may be used to find the disoccluded area in the at least one view.

Where the at least one view is a synthesized view, the disoccluded area must be approximated by the view synthesizer. The greater the area that needs approximating the more likely the approximation will be detected by a viewer. Thus the amount of disoccluded area may be used as an indicator of the quality score. The edge detection may be performed using a Sobel operator, or Canny edge detection.

The method may further comprise aligning the first and second edge maps prior to calculating the symmetric difference between the first and second edge map. The method may further comprise determining a characteristic of each of a plurality of 2D views for a subset of the 3D view compositions of the 3D video stream.

An exponential function may be applied to calculate the impact the variation has on the quality score. The impact apparent to a viewer that a particular variation has can be modeled with an exponential function of the magnitude of the variation. For example, a minor variation is unlikely to be noticed by a viewer; but if the 2D views are sufficiently different, then the 3D effect may be lost, which would be very noticeable to the viewer.

The method may further comprise taking an average of the variation between the determined characteristics of 2D views in a 3D view composition over a period of time or a number of video frames. The average may be a weighted average. A 3D view composition having significant variation between 2D views may be given a greater weight than 3D view composition having only minor variation.

There is further provided a computer-readable medium, carrying instructions, which, when executed by computer logic, causes said computer logic to carry out any of the methods defined herein.

There is further still provided an apparatus for determining the quality of a three dimensional (3D) video stream, wherein the 3D video comprises at least one 3D view composition, each 3D view composition defining a plurality of two dimensional (2D) views. The apparatus comprises an assessment module, a variation module, and a scoring module. The assessment module determines a characteristic of each of a plurality of 2D views. The variation module calculates a variation in the characteristic, the variation calculated between the 2D views corresponding to the same 3D view composition. The scoring module calculates a quality score for the 3D video sequence, the quality score based upon the calculated variation.

The characteristic of a 2D view may comprise any of: horizontal shift; vertical shift; 2D quality score; luminance; chrominance; and quantization parameter.

Where the characteristic of a 2D view that is determined is horizontal shift, then the apparatus may further comprise: a disparity map generating module for generating a disparity map from the horizontal shift between at least two 2D views corresponding to the same 3D view composition.

The scoring module may further base the quality score upon the detection of at least one item present in a 2D view but missing from another; whereby an item is detected as missing if the horizontal shift calculated by the disparity map generating module in the vicinity of the item exceeds the distance of the item from a view boundary.

The apparatus may further comprise an inverted parallax detection module. The inverted parallax detection module is arranged to detect inverted parallax if a majority of the calculated points of the disparity map are negative, and wherein the output of the inverted parallax detection module is used by the scoring module to calculate a quality score for the 3D video sequence.

The apparatus may further comprise a view synthesis artifact detection module, the view synthesis artifact detection module arranged to: perform edge detection on at least one view to create a first edge map; perform edge detection on a disparity map corresponding to the at least one view to create a second edge map; and calculate the symmetric difference between the first and the second edge maps.

BRIEF DESCRIPTION OF THE DRAWINGS

An objective 3D video quality assessment model will now be described, by way of example only, with reference to the accompanying drawings, in which:

FIGS. 5*a* and 5*b* show the views of a 3D scene comprising a cube;

FIGS. 6*a* and 6*b* show the views of a different 3D scene comprising a cube at a different position to that of FIG. 5;

FIGS. 7 *a* to *f* illustrate various steps in the calculation of the disoccluded area of a synthesized view;

DETAILED DESCRIPTION

Figure 1:
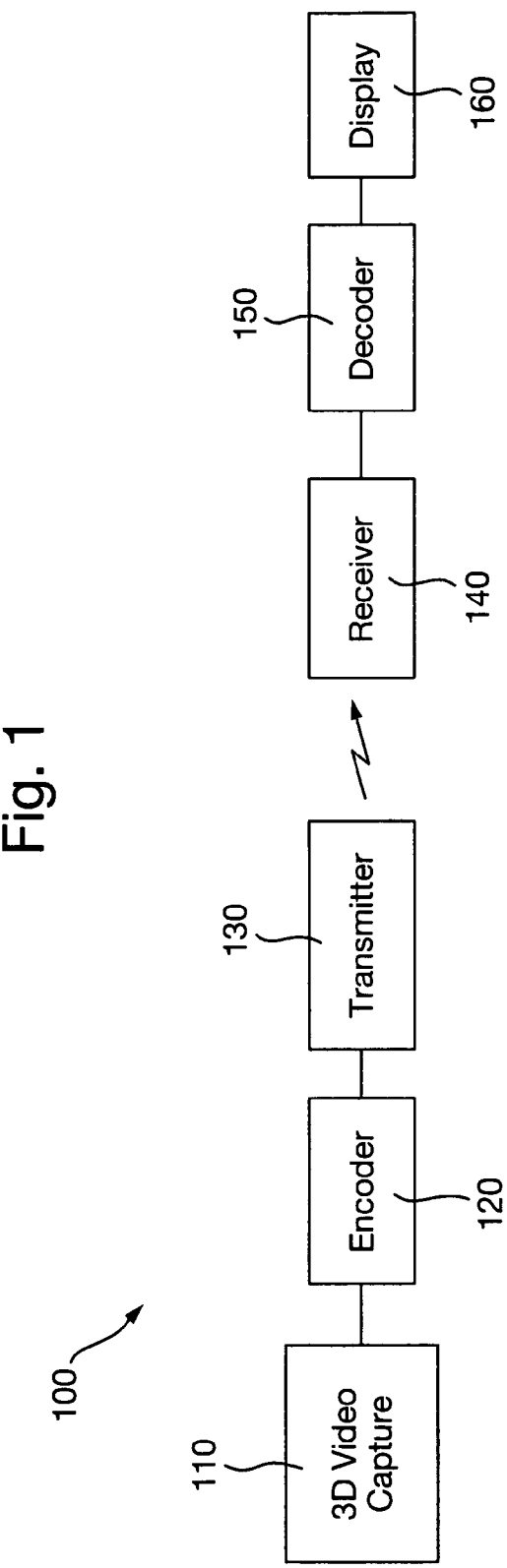
FIG. 1 illustrates a 3D video system.

FIG. 1 illustrates a 3D video system 100. The 3D video system 100 comprises a transmission side and a reception side. The transmission side comprises a 3D video capture module 110, an encoder 120, and a transmitter 130. The reception side comprises a receiver 140, a decoder 150, and a display 160.

In operation of the 3D video system 100, the 3D video capture module captures at least one view of a 3D scene. The capture may be performed by a physical camera in a real 3D environment, or it may be performed by a virtual camera in a computer generated 3D world. The 3D video capture module typically captures at least two 2D views, at different perspectives. The 3D video capture may comprise taking one 2D view and a depth map. The captured 3D video is sent to an encoder 120 where it is compressed and prepared for transmission. Transmitter 130 transmits the encoded 3D video.

The encoder 120 may alternatively obtain the 3D video by retrieving it from a storage media.

A receiver 140 receives the transmission and sends the encoded 3D video to a decoder 150. The decoder 150 decodes the 3D video stream and sends this to the display 160, which may be a stereoscopic display.

Figure 2:
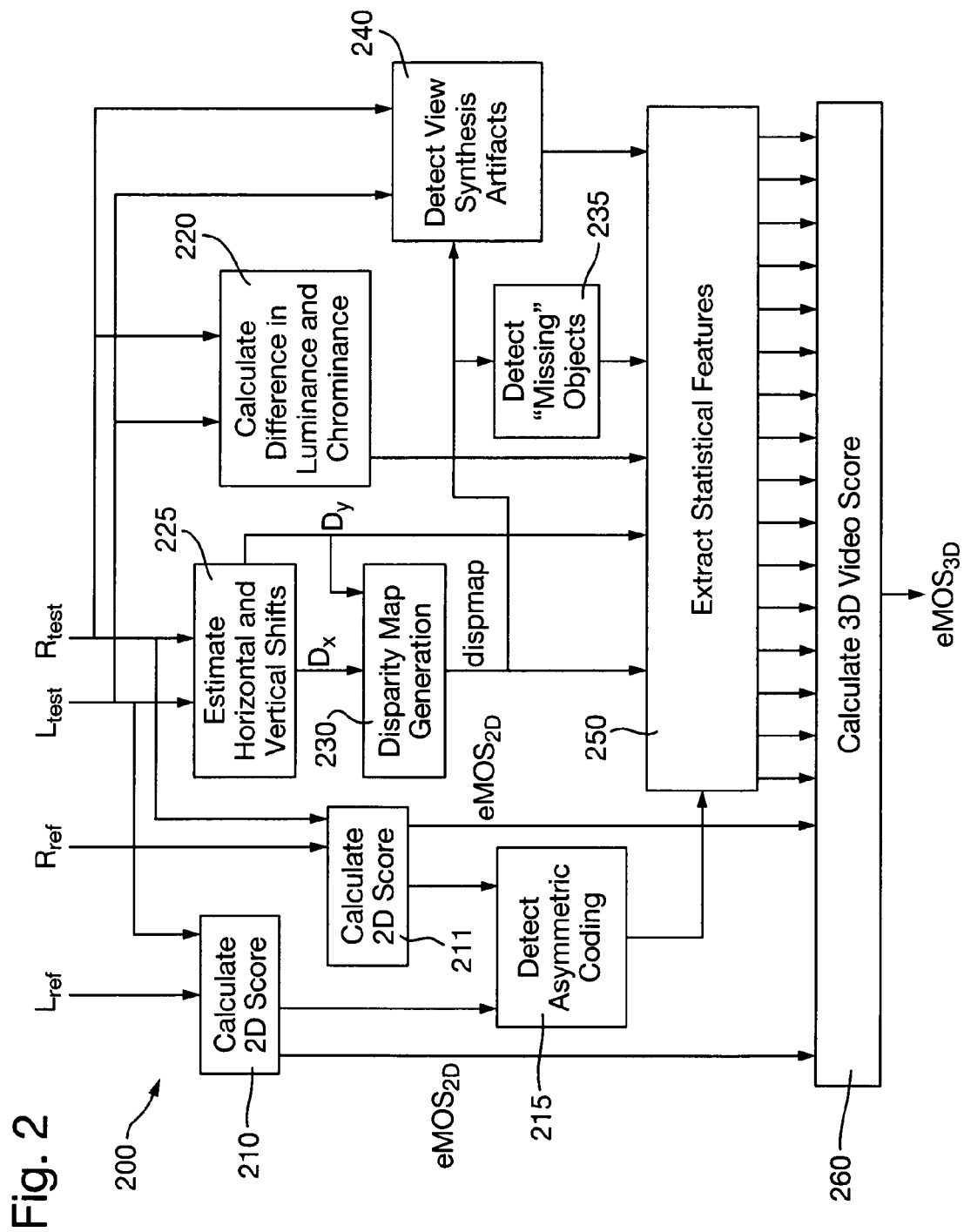
FIG. 2 shows an objective 3D video quality assessment model.

FIG. 2 shows an objective 3D video quality assessment model 200 as described herein. It comprises a plurality of optional modules which estimate the 2D quality as well as most of the 3D artefacts. A final score, $eMOS_{3D}$, is output. This represents the total quality score of the 3D video. In the embodiment depicted in FIG. 2 the 3D quality model 200 is a full-reference (FR) model, reference frames $L_{ref}$ and $R_{ref}$ are used in the assessment of the 2D video score. In another embodiment of the model a no-reference 2D model is used instead using only the test frames $L_{test}$ and $R_{test}$, making the 3D quality model 200 a no-reference (NR) model.

The quality assessment model 200 comprises a plurality of optional modules, each arranged to perform a different assessment of the 3D video. The model 200 comprises:
a module 210 for calculating a 2D quality score of a left view;
a module 211 for calculating a 2D quality score of a right view;
a module 215 for detecting asymmetric coding;
a module 220 for calculating the difference in luminance and chrominance;
a module 225 for estimating horizontal and vertical shifts;
a module 230 for generating a disparity map;
a module 235 for detecting missing objects; and
a module 240 for detecting view synthesis artifacts.

The outputs of these modules are provided to a module 250 arranged to extract statistical features from the module outputs. These statistical features are combined in a further module 260 for calculating a 3D video score $eMOS_{3D}$.

Calculating a 2D Score (210, 211)

The 2D quality score may be calculated using a perceptual model like J.341 or a pixel based metric such as PSNR or SSIM. The 2D metric could be a FR (as shown in FIG. 2), RR (reduced reference) or NR. The model may be applied to the decoded video, the encoded video bitstream or network parameters extracted from transport layer protocols.

In this embodiment the $eMOS_{2D}$ input to the 3D video quality calculation 260 is the average of the two 2D scores, i.e.

$$f_{2Davg}(eMOS_{2DL}, eMOS_{2DR}) = \frac{eMOS_{2DL} + eMOS_{2DR}}{2}$$

and the absolute difference between the two 2D scores, i.e.

$$f_{2D\,absdif}(eMOS_{2DL}, eMOS_{2DR}) = |eMOS_{2DL} - eMOS_{2DR}|$$

where $eMOS_{2DL}$ is the estimated MOS value calculated for the left view and $eMOS_{2DR}$ the estimated MOS value calculated for the right view.

Other functions $f_{2D}(eMOS_{2DL}, eMOS_{2DR})$ may be utilized to estimate the 2D quality score. Spatial and temporal activity metrics from the two views can also be useful as input to the calculation of the estimated 2D video quality.

Detecting Asymmetric Coding (220)

When encoding the input views using simulcast or multiview coding (MVC) it is possible to encode one of the views (or a plurality of the views if there are more than two views) with better quality than the other. To a certain degree, the overall quality of the 3D video can be increased for a given bitrate if one of the views is encoded at slightly higher quality than the rest. To an extent, the lower quality of the worst view can be masked by the higher quality of the best view. But as the differences in encoding quality increases the total quality becomes worse, for the same given bitrate, than if the two views had been encoded at equal quality.

In MVC the similarities between two views are often exploited by having one of the views predicted from the first view. In this case the quality of the second view is often slightly worse than the first one, unless this is compensated for when setting the quantization parameter (QP) for each view during encoding. The differences in encoding quality may be detected by comparing the estimated 2D quality score ($eMOS_{2D}$) of the two views. A large difference would indicate that the two views have been encoded with different qualities. If the encoded bitstream is available, the quantizer parameter (QP) may also be used to determine the difference in encoding quality and the impact from it. Another option is to apply an edge detection filter (such as the Sobel operator or the Canny edge detection filter) on both views and then determine from the output the differences in sharpness between the two views.

Detecting Differences in Luminance and Chrominance (220)

Even a slight mismatch in luminance (brightness) or chrominance between the two output views may be annoying for the viewer. These differences may arise from improper calibration of the cameras used for recording the video. It could also be due to the difference in amount of light between the two views of a scene making the aperture behave differently for the two cameras. One extreme example would be if one camera was in the shadow, while the other one was in the sun.

The difference in luminance and chrominance between the two views can be calculated as the numeric difference per pixel between the luminance (Y) values and between the chrominance values (Cb, Cr) of the video as described by the formulas below. A person skilled in the art would understand that the luminance and color components could be translated into a different color space format such as RGB, YUV, YPbPr, etc.

$$D_{lum} = \frac{1}{nbrFrames \cdot height \cdot width} \sum_{m=0}^{nbrFrames} \sum_{y=1}^{height} \sum_{x=1}^{width} (Y_L - Y_R)$$

$$D_{Cb} = \frac{1}{nbrFrames \cdot height \cdot width} \sum_{m=0}^{nbrFrames} \sum_{y=1}^{height} \sum_{x=1}^{width} (Cb_L - Cb_R)$$

$$D_{Cr} = \frac{1}{nbrFrames \cdot height \cdot width} \sum_{m=0}^{nbrFrames} \sum_{y=1}^{height} \sum_{x=1}^{width} (Cr_L - Cr_R)$$

A function such as an exponential function may be applied to the values after the per-pixel-differences have been calculated. This would let a large difference be assigned a relatively larger value than a small difference, which would compensate for the fact that very small differences are in general not noticed by the viewer.

Since the differences in luminance or chrominance are not necessarily the same for every frame over a sequence, the differences could be weighted differently per frame instead of just taking the average of all frames. A frame containing large differences could be weighted higher than a frame containing only small differences. This would correspond more accurately to how the quality is perceived over time. Sudden drops in quality over a short time period are often noted very well by the viewer.

Estimating Vertical and Horizontal Shift (225)

Vertical shifts between the left and the right views usually arise due to the cameras (real or virtual) used to capture the scene were not positioned in exactly the same horizontal level during the capture of the 3D scene. Even very small pixel shifts in vertical direction can be annoying to look at. Large vertical pixel shifts will break the 3D convergence thus resulting in severe eye-strain.

When it comes to horizontal shifts there is a built-in shift in the nature of 3D. To be able to produce the 3D effect, the cameras (real or virtual) are positioned with a horizontal offset (called baseline). This gives a horizontal shift to objects that are different depending on the objects distance to the cameras. Objects near the camera will shift more in horizontal direction than an object in the background. This is depicted in FIGS. 3, 4a and 4b.

Figure 3:
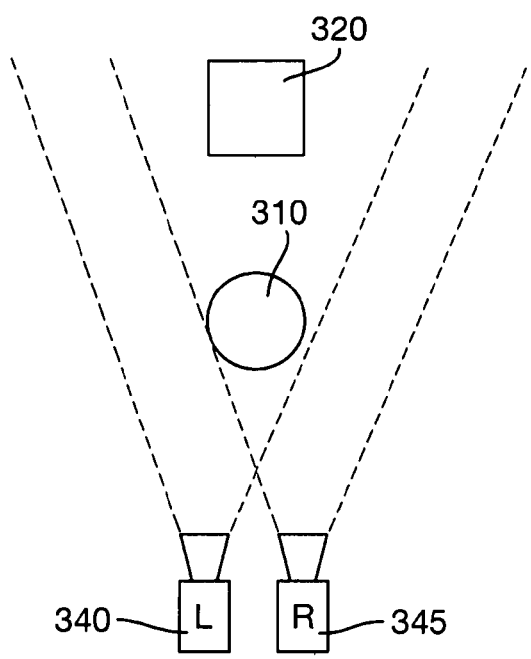
FIG. 3 shows a plan view of a 3D scene.
Figure 4A:
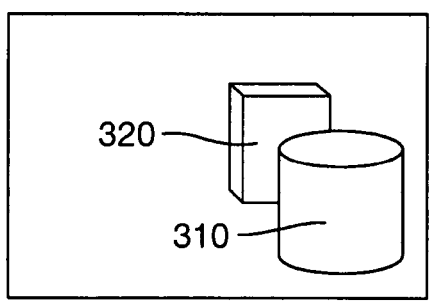
FIGS. 4*a* and 4*b* show the respective views captured by the left and right cameras of FIG. 3.
Figure 4B:
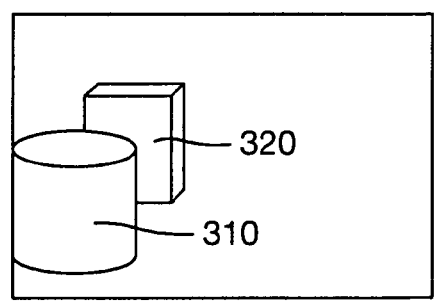

FIG. 3 shows a plan view of a 3D scene comprising a cube 310 and a cylinder 320. A 3D image of the scene is captured by two cameras, a left camera 340 and a right camera 345. The cylinder 310 is closer to the cameras than the cube 320. FIG. 4a shows the view captured by the left camera (340), and FIG. 4b shows the view captured by the right camera (345). The horizontal location of an object in each view is dependent upon its distance from the cameras. Accordingly, the cylinder 310 has a greater horizontal shift between the views taken by the left camera 340 and the right camera 345 than the horizontal shift of the position of the cube 320 in the views taken by the left camera 340 and the right camera 345.

To compensate for unnatural depths, different screen sizes, different viewing distances etc, the two views can be shifted globally (evenly for all pixels) relative to each other.

Generating Disparity Map (230)

A disparity map is a depth map holding the horizontal shifts per pixel between the two views.

A number of different methods may be used to produce disparity maps and to estimate vertical and horizontal shifts. The quality model described herein may use any algorithm producing proper disparity maps and/or detecting vertical and horizontal shifts. An algorithm found to work well for the purpose of finding mean vertical and horizontal shifts is the SIFT algorithm. The SIFT algorithm works by extracting important features from an image. Firstly, the SIFT algorithm is applied on both left/right images separately and then a matching algorithm is used to find the similar features between the two image pairs. When features that are common in stereo pairs are found, horizontal and vertical shifts are calculated using image coordinates. Shifts for all the features are accumulated and then an outlier detection algorithm is applied to discard any incorrect estimates. Finally a mean is taken for all features to get the correct horizontal and vertical shifts for the stereo pair.

Detecting Inverted Parallax

If the two views have been swapped with each other the viewer will see inverted parallax. This can be detected by noting if the majority of the pixels of the disparity map have a negative value or if the average horizontal shift is negative.

Detecting "Missing" Objects (235)

If objects near (or far away from) the camera are halfway or fully outside the border for one of the views, the eyes won't be able to converge the two views at that point. This will cause an annoyance and/or eye-strain for the viewer. How this is perceived by a viewer is illustrated in the example in FIGS. 5 and 6.

FIG. 5a shows a left view of a 3D scene comprising a cube 510, and FIG. 5b shows a corresponding right view of the same scene. The full extent of cube 510 is visible in both the left view (FIG. 5a) and the right view (FIG. 5b). FIGS. 6a and 6b show the left view and right view respectively for a different scene comprising a cube 610 at a different position to the cube 510 in its scene. The full extent of cube 610 is visible in the left view shown in FIG. 6a, but the full extent is not visible in the right view shown in FIG. 6b. In FIG. 6b, a portion of cube 610 falls outside the extent of the right view and so is not shown in the right view.

FIGS. 5 and 6 show examples of how horizontal shifts over the image border are perceived by a viewer. By crossing the eyes a viewer can converge the left and right views of FIG. 5 to see the cube in 3D. When trying this with the views of FIG. 6 the viewer will have difficulty converging the images since the cube 610 is partially outside the border in the right image.

To detect whether there are any objects partly or fully missing in one of the views the disparity map can be used. A disparity map is calculated with respect to either the left view or the right view. If the disparity maps with respect to both of the views are generated then half occluded objects can be detected using a left-right consistency check, also called bidirectional matching. The disparity values from one of the maps are projected on the other disparity map to check whether a pixel is occluded or not. The disparity map will tell what the horizontal shift is at the borders of an image. If the horizontal shift exceeds the distance to the border there will be some missing information in one of the views. The more information that is missing, the more annoying this artifact will be. Moreover, objects with distinct borders and patterns will look worse than less structured evenly colored textures.

Detecting View Synthesis Artifacts (240)

Virtual views can be synthesized from a lesser number of views that have been transmitted. This can advantageously reduce the amount of data that is needed to encode the 3D video. However, in some cases artifacts cannot be avoided, or at least are hard to conceal. One example is when an object is disoccluded, meaning that the object is occluded in the real views but should be shown in the synthesized virtual view. Since no information exists of the disoccluded area the view synthesis needs to fill in the missing information by guessing. This guess will likely be inaccurate and so noticeable to the viewer.

If an occluded object is not correctly depicted in a synthesized view then this artifact will be present. A Left-Right consistency check is useful in this case as well to find the missing objects between the two image pairs. In the preferred embodiment an edge detection algorithm (e.g. Sobel operator or Canny edge detection) is first applied to the left view and the disparity map produced from both views. This is illustrated in FIG. 7. Then the symmetric difference between the two edge maps (f=dΔe) is calculated. Before doing so the two edge maps may need to be properly aligned. The area produced from the edges remaining after the symmetric difference calculation is the area that is disoccluded in the view. This is then repeated for the right view in order to find areas that have been occluded in the left view.

FIG. 7a shows a Left view of a 3D scene. FIG. 7b shows the Right view of the same 3D scene. FIG. 7c shows a disparity map generated from left and right views, the different shadings show different depths. In FIG. 7c the background depth is darkly shaded, with objects closer to the camera given lighter shading. The square is not shaded at all because this is closest to the camera, whereas the circle is an intermediate shade as this is at a depth in between the background and the square. FIG. 7d shows edge detection applied on the right view, and FIG. 7e shows edge detection applied on the disparity map. FIG. 7f shows the symmetric difference between e and d.

If it is known that the view that has the disoccluded area is a view produced by view synthesis, then it is possible for the model to determine that the disoccluded area is not perfectly generated and that there likely is a visible artifact present. Therefore, the number of disoccluded pixels in the view is given as a parameter for the determination of quality.

Extract Statistical Features (250)

Certain statistical functions can be calculated from the extracted parameters described in the above sections. The statistical functions may include mean, maximum and minimum, absolute value, standard deviation, variance, etc. In the embodiment shown in FIG. 2 the model is a full-reference model and so the ground truth or optimal disparity map would be available. As such, correlation between the generated and optimal disparity map can be calculated which serves as an important parameter in evaluation of the 3D video. One or more statistical functions may be applied on top of each other for the same input parameter. The statistical functions may be applied spatially per frame and/or temporally over time.

Merging Parameters into a Quality Score (260)

Once all parameters of interest have been extracted from the two input views and proper statistical functions have been applied a score can be calculated for the 3D quality. The quality score may be determined from only one parameter of interest.

The quality score for the 3D video may be calculated according to $$eMOS_{3D}=f_{3D}(p_{3D0}, p_{3D1}, \ldots, p_{3Dn})$$

where $f_{3D}$ is a function for calculating the impact the 3D parameters (potentially after statistical functions have been applied) $p_{3D0}, p_{3D1}, P_{3Dn}$ have on the overall quality.

$f_{3D}$ could for instance be a linear function of the form $$f_{3D}(p_{3D0}, p_{3D1}, \ldots, p_{3Dn}) = \sum_{i=0}^{n} w_i p_{3Di}$$

or a multiplicative function of the form $$f_{3D}(p_{3D0}, p_{3D1}, \ldots, p_{3Dn}) = \prod_{i=0}^{n} w_i p_{3Di}$$

or a combination of the two or some other non-linear function such as a higher order polynomial.

The coefficients $w_0, w_1, \ldots, w_n$ of the model may be determined by training the model on subjective data, i.e. mean opinion score data obtained from subjective tests where several test persons have rated the quality of a number of sequences. In this way the objective quality model may be tuned to give results which correspond to those derived from test subjects.

Typically the model estimates a quality score for a certain time frame, e.g. ten seconds. The model scores may be calculated more often if a sliding window approach is applied. For instance, parameters averaged over ten seconds could be given to the model every second, yielding a quality score every second taking in consideration the last ten seconds.

Figure 8:
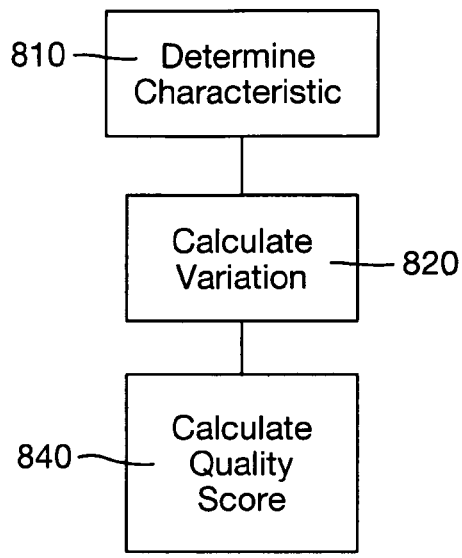
FIG. 8 illustrates a method of determining the quality of a three dimensional video stream.

FIG. 8 illustrates a method of determining the quality of a three dimensional video stream. The 3D video comprises at least one 3D view composition, each 3D view composition defining a plurality of two dimensional views. The method comprises determining 810 a characteristic of each of a plurality of 2D views. The method further comprises calculating 820 a variation in the characteristic, the variation calculated between the 2D views corresponding to the same 3D view composition. The method further comprises calculating 840 a quality score for the 3D video sequence, the quality score based upon the calculated variation.

By calculating a variation in a characteristic of at least two 2D views of a 3D composition, a quantitative determination can be made of the quality of a 3D effect created by the 3D composition. Such variation between 2D views is common in 3D video streams due to the capturing, encoding and decoding processes, and so the above method provides a useful determination of quality of a 3D video stream.

Figure 9:
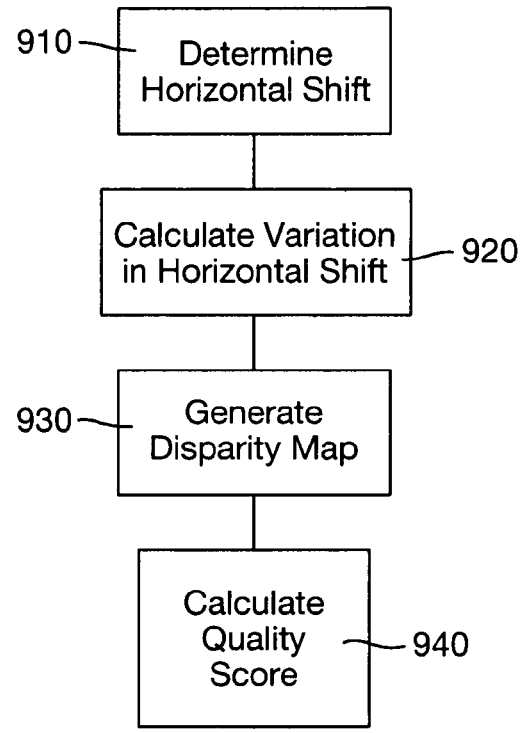
FIG. 9 illustrates another method of determining the quality of a three dimensional video stream.

FIG. 9 illustrates another method of determining the quality of a three dimensional video stream. The method comprises determining 910 a horizontal shift for each of a plurality of 2D views. The method further comprises calculating 820 a variation in the horizontal shift 920, the variation calculated between the 2D views corresponding to the same 3D view composition. The method further comprises generating 930 a disparity map from the horizontal shift between at least two 2D views corresponding to the same 3D view composition. The method further comprises calculating 940 a quality score for the 3D video sequence, the quality score based upon the calculated variation.

A horizontal shift and/or a vertical shift can be calculated between two views of the same 3D view composition by identifying like features in each view and calculating the difference in their position. Like features may be identified using a matching algorithm such as the SIFT algorithm. The quantization parameter may be obtained from an encoded video bistream. The quantization parameter may be obtained prior to decoding the encoded video bitstream.

Figure 10:
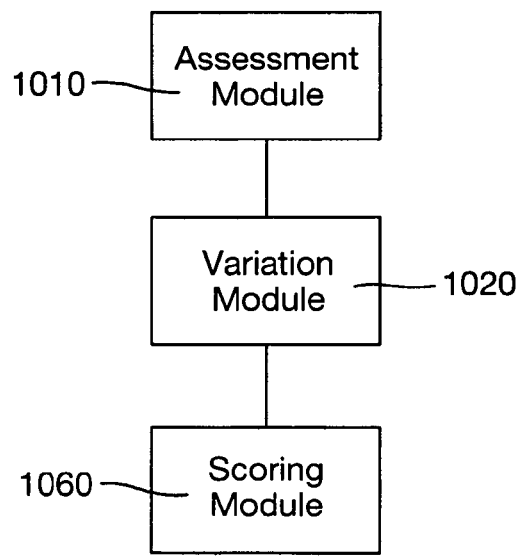
FIG. 10 shows an apparatus for determining the quality of a three dimensional video stream.

FIG. 10 shows an apparatus for determining the quality of a three dimensional (3D) video stream, wherein the 3D video comprises at least one 3D view composition, each 3D view composition defining a plurality of two dimensional (2D) views. The apparatus comprises: an assessment module 1010 for determining a characteristic of each of a plurality of 2D views; a variation module 1020 for calculating a variation in the characteristic, the variation calculated between the 2D views corresponding to the same 3D view composition; and a scoring module 1060 for calculating a quality score for the 3D video sequence, the quality score based upon the calculated variation.

Figure 11:
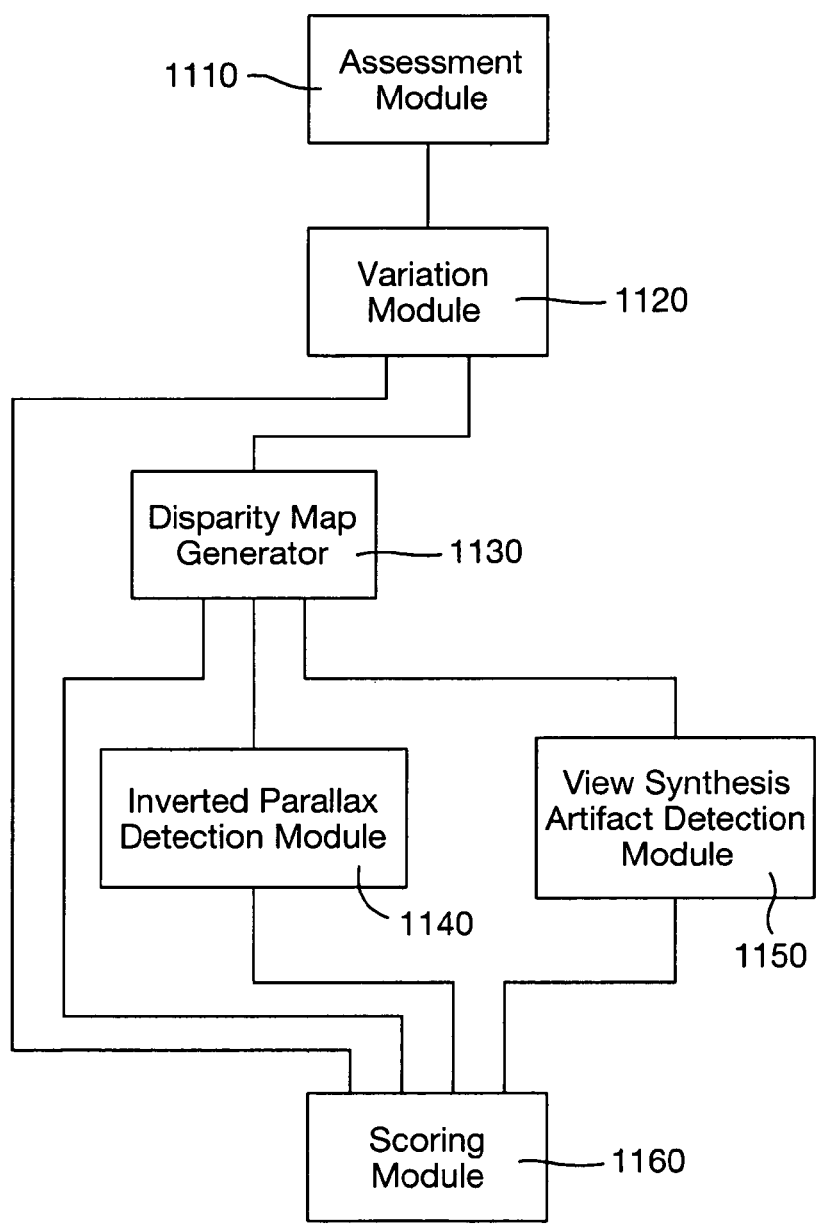
FIG. 11 shows an alternative apparatus for determining the quality of a three dimensional (3D) video stream.

FIG. 11 shows an alternative apparatus for determining the quality of a three dimensional (3D) video stream, wherein the 3D video comprises at least one 3D view composition, each 3D view composition defining a plurality of two dimensional (2D) views. The apparatus comprises: an assessment module 1110, a variation module 1120, a disparity map generator 1130, an inverted parallax detection module 1140, a view synthesis artifact detection module 1150, and a scoring module 1160.

The assessment module 1110 determines a characteristic of each of a plurality of 2D views. The variation module 1120 calculates a variation in the characteristic, the variation calculated between the 2D views corresponding to the same 3D view composition.

In this embodiment, one of the characteristics of a 2D view determined by the assessment module 1110 comprises the horizontal shift. The disparity map generating module 1130 generates a disparity map from the horizontal shift between at least two 2D views corresponding to the same 3D view composition.

The inverted parallax detection module 1140 is arranged to detect inverted parallax if a majority of the calculated points of the disparity map are negative, and wherein the output of the inverted parallax detection module is used by the scoring module to calculate a quality score for the 3D video sequence.

The view synthesis artifact detection module 1150, is arranged to: perform edge detection on at least one view to create a first edge map; perform edge detection on a disparity map corresponding to the at least one view to create a second edge map; and calculate the symmetric difference between the first and the second edge maps.

Finally, the scoring module 1160 calculates a quality score for the 3D video sequence, the quality score based upon the calculated variation.

The 3D video quality model disclosed herein is able to estimate the quality impact of certain factors on the perceived quality of 3D video. This includes detecting the impact of vertical shift between two views, asymmetric coding between two views, differences in luminance and chrominance between two views, impact of negative parallax, image border 3D artifacts and view synthesis artifacts. The outcome is a 3D model that is better able to estimate the perceived quality of 3D video.

The 3D model may be used by a service provider to monitor a 3D video service such as 3DTV. The model could be placed in a node adjacent to the camera (i.e. software for editing the 3D video), a network node, a set-top box a mobile camera or equivalent. The features used in this model could also be used to estimate the quality of 3D still images.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

APPENDIX A—REFERENCES

The following documents give background information to some of the techniques referred to in the present application. These documents are incorporated into the present application by reference.
1. Video and Requirements Group, "Vision on 3D Video," ISO/IEC JTC1/SC29/WG11 N10357, Lausanne, C H, February 2008. Available online: http://www.chiariglione.org/mpeg/visions/3dv/index.htm
2. A. Smolic, K. Mueller, P. Merkle, P. Kauff, and T. Wiegand, "An Overview of Available and Emerging 3D Video Formats and Depth Enhanced Stereo as Efficient Generic Solution", Proceedings of 27th Picture Coding Symposium (PCS 2009), May 6-8, 2009, Chicago, Ill., USA.
3. Stereoscopic Image Quality Metrics and Compression. Paul Gorley, Nick Holliman, Department of Computer Science, Durham University, United Kingdom-2008
4. Towards compound stereo-video quality metric: a specific encoder-based framework, Atanas Boev, Atanas Gotchev, Karen Egiazarian, Anil Aksay, Gozde Bozdagi Akar-2011
5. Quality Assessment of Stereoscopic Images, EURASIP Journal on Image and Video Processing-Volume-2008
6. Objective Quality Assessment Of Depth Image Based Rendering In 3dtv System, Hang Shao, Xun Cao, Guihua Er-2009
7. Algorithmic Assessment Of 3d Quality Of Experience For Images And Videos Anish Mittal, Anush K. Moorthy, Joydeep Ghosh and Alan C. Bovik-2011

The invention claimed is:
1. A method of determining the quality of a three dimensional (3D) video stream, wherein the 3D video stream comprises at least one 3D view composition, the at least one 3D view composition defining a plurality of two dimensional (2D) views, the method comprising:
   determining a characteristic of each of the plurality of 2D views wherein the characteristic of the 2D views comprises a quantization parameter of the 2D views;
   calculating a variation in the characteristic, the variation calculated between the 2D views corresponding to the at least one 3D view composition, wherein the characteristic of the 2D views comprises horizontal shift;
   generating a disparity map from the horizontal shift between at least two of the 2D views corresponding to the at least one 3D view composition;
   detecting at least one view synthesis artifact of a plurality of view synthesis artifacts by performing operations comprising:
      performing edge detection on at least one view of the plurality of 2D views to create a first edge map;
      performing edge detection on a disparity map corresponding to the at least one view to create a second edge map, wherein the disparity map corresponding to the at least one view to create a second edge map comprises a depth map based on two views of the plurality of 2D views; and
      calculating a metric difference between the first and the second edge maps; and
   calculating a quality score for the 3D video stream based upon the variation in the characteristic, and based upon the detecting the at least one view synthesis artifact.
2. The method of claim 1, wherein the quality score is calculated based upon detection of at least one item present in one of the 2D views but missing from another one of the 2D views; wherein an item is detected as missing based on the horizontal shift measured in the vicinity of the item exceeding the distance of the item from a view boundary.

3. The method of claim 1, wherein the quality score is calculated based upon detection of inverted parallax; wherein inverted parallax is detected based on a majority of the calculated points of the disparity map being negative.

4. The method of claim 1, wherein the edge detection is a Sobel operator, or Canny edge detection.

5. The method of claim 1, further comprising:
aligning the first and second edge maps prior to calculating the symmetric difference between the first and second edge map.

6. The method of claim 1, further comprising determining a characteristic of each of a plurality of the 2D views for a subset of a plurality of the 3D view compositions of the 3D video stream.

7. The method of claim 1, wherein an exponential function is applied to calculate the impact the variation has on the quality score.

8. The method of claim 1, further comprising taking an average of the variation between the determined characteristics of 2D views in a 3D view composition over a period of time or a number of video frames.

9. A non-transitory computer-readable medium, carrying instructions, which, when executed by computer logic, causes said computer logic to carry out the methods defined by method of claim 1.

10. An apparatus for determining the quality of a three dimensional (3D) video stream, wherein the 3D video stream comprises at least one 3D view composition, the at least one 3D view composition defining a plurality of two dimensional (2D) views, the apparatus comprising:
a circuit configured to perform operations comprising:
determining a characteristic of each of a plurality of 2D views wherein the characteristic of the 2D views comprises a quantization parameter of the 2D views;
calculating a variation in the characteristic, the variation calculated between the 2D views corresponding to the at least one 3D view composition, wherein the characteristic of the 2D views comprises horizontal shift;
generating a disparity map from the horizontal shift between at least two of the 2D views corresponding to the at least one 3D view composition;
detecting at least one view synthesis artifact of a plurality of view synthesis artifacts by performing operations comprising:
performing edge detection on at least one view of the plurality of 2D views to create a first edge map;
performing edge detection on a disparity map corresponding to the at least one view to create a second edge map, wherein the disparity map corresponding to the at least one view to create a second edge map comprises a depth map based on two views of the plurality of 2D views; and
calculating a metric difference between the first and the second edge maps; and
calculating a quality score for the 3D video stream based upon the variation in the characteristic, and based upon the detecting the at least one view synthesis artifact.

11. The apparatus of method of claim 10, wherein the circuit is further configured to calculate the quality score based upon the detection of at least one item present in one of the 2D views but missing from another one of the 2D views; wherein an item is detected as missing based on the horizontal shift calculated by the disparity map generating circuit in the vicinity of the item exceeding the distance of the item from a view boundary.

12. The apparatus of claim 10, further comprising an inverted parallax detection circuit configured to detect inverted parallax based on a majority of the calculated points of the disparity map being negative, and wherein the output of the inverted parallax detection circuit is used by the circuit to calculate a quality score for the 3D video stream.

13. The apparatus of claim 10, wherein the edge detection is a Sobel operator, or Canny edge detection.

\* \* \* \* \*